(No Model.)
L. BAUDREAU.
SPRING FORK FOR BICYCLES.
No. 400,727. Patented Apr. 2, 1889.
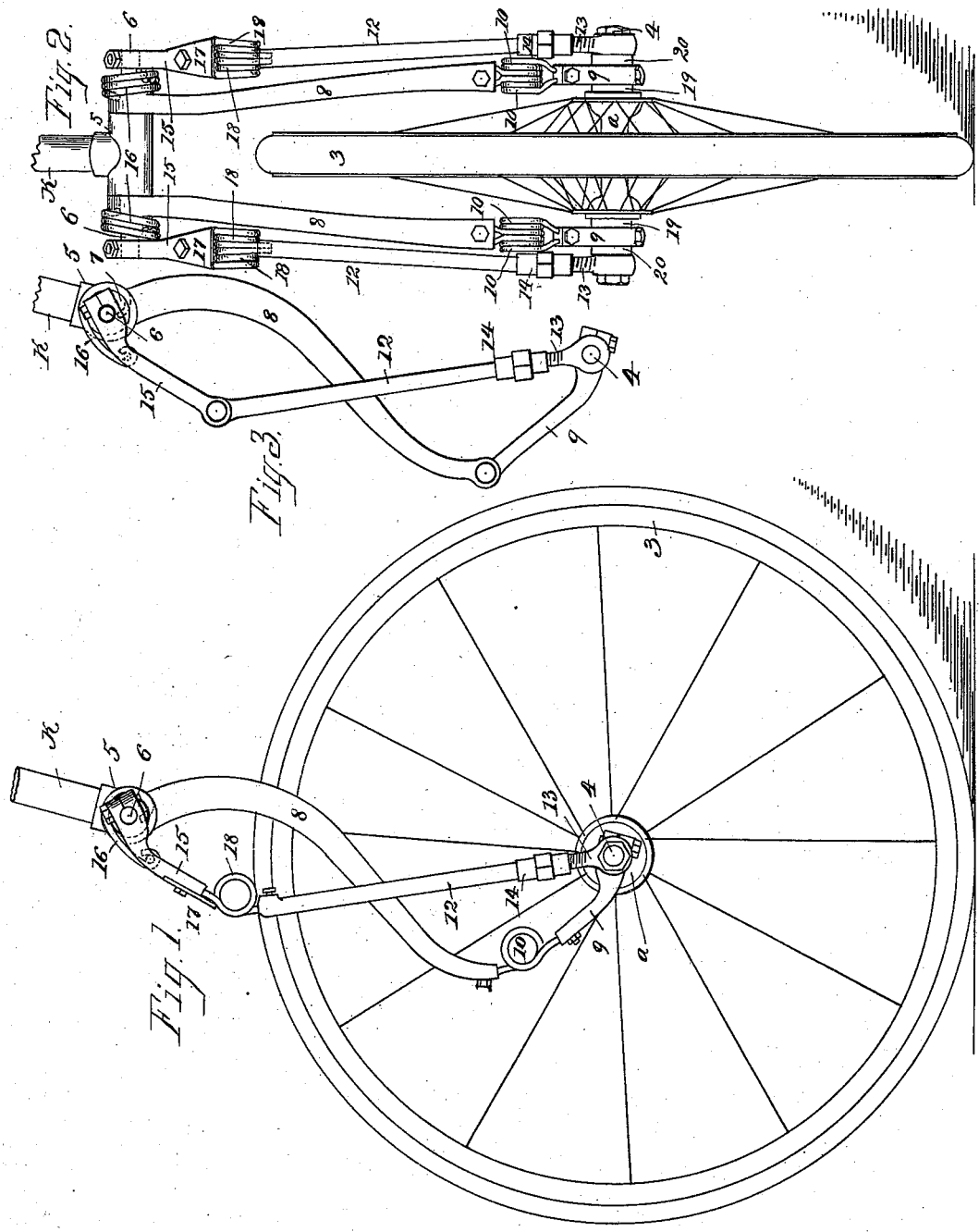
Witnesses.
Wm. F. Bellows
G. M. Chamberlain.
Inventor,
Leon Baudreau,
By his Attorneys

UNITED STATES PATENT OFFICE.

LEON BAUDREAU, OF CHICOPEE FALLS, MASSACHUSETTS.

SPRING-FORK FOR BICYCLES.

SPECIFICATION forming part of Letters Patent No. 400,727, dated April 2, 1889.

Application filed September 18, 1888. Serial No. 285,746. (No model.)

*To all whom it may concern:*

Be it known that I, LEON BAUDREAU, a citizen of the Dominion of Canada, residing at Chicopee Falls, in the county of Hampden and State of Massachusetts, have invented new and useful Improvements in Spring-Fork Devices for Bicycles, of which the following is a specification.

This invention relates to bicycles and similar vehicles, the object being to provide improved spring-fork connections between the wheel-axle and the fork-head, whereby an easy vertical spring motion of the parts of the machine whose weight is carried by said axle is obtained, and the wheel is supported by and between the fork-legs in its proper plane of rotation; and the invention consists in the peculiar construction and arrangement of said spring-fork connections, all as hereinafter fully described, and pointed out in the claims.

In the drawings forming part of this specification, Figure 1 is a side and Fig. 2 a front elevation of a vehicle-wheel and spring-fork devices applied thereto constructed according to my invention. Fig. 3 illustrates a modified construction of portions of said devices.

In the drawings, 3 indicates the wheel of a bicycle or similar vehicle, having the usual hub, *a*, and 4 the axle on which said wheel rotates in the usual manner, and 5 indicates the lower portion of a fork-head of said vehicle, which head may be of any suitable construction, but is to be provided with said part 5, which is of a suitable form internally to receive therethrough a fork-head shaft, 6, which has a position therein substantially parallel with said axle 4, and is adapted to have a slight rocking motion therein, the said lower portion, 5, being of course a part of or rigidly secured to the fork-head proper.

The supporting devices for the fork-head, including the spring features thereof, which are interposed between said head and the axle 4, are constructed and operate as follows: Two curved fork-legs, 8, are hung by their upper ends on said shaft 6 at opposite ends of the head part 5 and have a degree of vibratory motion thereon. Said legs 8, as shown, extend downward, first in a curved line toward the rear of the wheel 3, and then in a reverse direction, whereby the lower ends thereof are brought to a position above and considerably forward of the wheel-axle 4. The lower end of each of said fork-legs 8 is connected with the wheel-axle 4 through the intermediary of an arm, 9, whose lower end is rigidly clamped to said axle, and to the upper end of which is rigidly attached one end of a coil-spring, 10, and the opposite end of said spring is rigidly attached to the lower end of said leg. The upper ends of said legs 8 have a connection with other coil-springs, 16, as below described, the last-named springs and said springs 10 constituting the spring-resistance connected with said legs between said fork-head part 5 and the axle 4.

An arm, 15, is rigidly clamped on each end of the shaft 6 and extends toward the forward edge of the wheel 3 in a downwardly-inclined direction, and a coil-spring, 16, has one end thereof attached, as shown, to the inner side of said arm, and the opposite end of said spring is connected to the upper end of the said fork-leg 8 by inserting the end of said spring in a suitable perforation in the end of said leg and there rigidly securing it, or by other suitable means. To the lower end of each of said arms 15 is rigidly secured one end of a coil-spring, 18, a cap, 17, being secured on the upper side of said arm 15, having its lower end extending partially over said spring 18 to form a suitable finish at the junction of said spring and the arm 15 and to more or less strengthen the connection of said spring with said arm. A post, 12, has its upper end rigidly connected to the lower end of each of said springs 18, and the lower end of each of said posts 12 is connected by a tubular nut, 14, with the end of an arm, 13, which is hung on the outer end of the axle 4 in such a way that it may have a certain degree of vibratory motion thereon. A circular nut, 7, (see Fig. 3,) is screwed onto each end of the shaft 6, outside of the upper ends of the fork-legs 8, to hold the latter in position against the ends of the head-part 5, and the said coil-springs 16 encircle said nuts. A washer, 19, is placed on the axle 4 between each end of the wheel-hub *a* and the adjoining ends of the arms 9, and a washer, 20, is placed on said axle between the latter-named arms and the arms 13.

The above-described spring-fork connections or fork-head-supporting devices are so constructed and applied between said head and the axle 4 that the spring elements thereof—18 and 10, especially—are mainly in positions forward of said axle, and the application of weight on the fork-head causes said springs 18 and 10 to be thrown still farther forward, the consequence of which is that when the vehicle is moving rapidly and the wheel encounters some obstacle upon the road, whereby it is suddenly thrown upward, the ends of the arms, the posts, and the legs 8, which are connected with the springs 10 and 18, together with the latter, are thrown still farther forward beyond the axle 4, thereby producing such an action of the said supporting devices between the axle and the fork-head as obviates in an important degree the constantly present danger which exists in bicycles that the rider may be thrown headlong over his wheel.

In addition to the foregoing advantages arising from the use of the above-described construction the interposition of the springs 16, 18, and 10 between the fork-head and the axle 4, together with the peculiar arrangement of the fork-legs 8, the posts 12, and their connecting-arms, as described, constitute spring-supporting devices possessing peculiar features, which conduce, essentially, to ease in riding a vehicle fitted with said devices and obviate entirely the inconvenience pertaining to such vehicles in which the rider is constantly subjected to the shaking and trembling motion of vehicles as ordinarily constructed. The said springs 16, connected each between the arm 15 and the upper end of the leg 8, offer resistance to the upward motion of the arm 15 and to the vibratory motion of the leg 8 when weight is applied to the fork-head, said springs 16 thus supplementing the resistance which the springs 10 and 18 offer to said weight and serving to maintain the parts normally in the positions shown.

The above-described construction of fork-head and axle connections embodies therein the said shaft 6, substantially parallel with the axle 4, which shaft is so nearly of the same length as said axle that it constitutes such a lever-connection between said devices and the fork-head as gives the rider of a vehicle great control over the wheel in steering and obviates the liability of the wheel to have what is termed a "twisting" motion or movement when the rider attempts quickly to change the direction of movement of the vehicle.

The above-referred-to modification of construction (illustrated in Fig. 3) consists in dispensing with the springs 10 and 18, and uniting, by suitable pivot or hinge connections, the ends of the arms 15 and posts 12 and the arms 9 and the legs 8, whereby said arms, posts, and legs are permitted to have substantially the same action, as described, as they are capable of when said springs are employed, and the springs 16 under such conditions of construction are made proportionately heavier to provide for the weight they must alone resist. The said leg 8, arm 9, and spring 10 and the post 12, the arm 15, and spring 18 constitute two sets of curved or angular arms, (identical on each side of the wheel,) each intermediately jointed, whether by springs or pivot connections, and so arranged in relation to each other and to said axle 4 and shaft 6 as to form substantially a figure 8.

The nuts 14, connecting the lower ends of the posts 12 with the ends of the arms 13, provide means for adjusting said posts longitudinally and the springs 18. Aside from said adjusting feature the post 12 and arm 13 may be made in one piece.

The above-described spring-fork devices may be advantageously applied to both the front and the rear wheel of a bicycle, and when applied to the said rear wheel the rear end of the backbone is rigidly connected to the said part 5 in substantially the position of the broken-off post K.

What I claim as my invention is—

1. The combination, with the axle and the shaft above and parallel thereto, of two sets of curved or angular arms, each intermediately jointed and connected by their ends to the said shaft and axle, arranged in relation to each other to form in substance a figure 8, and a spring applied to exert a pressure between said angular arms to maintain them in their relations described and to yield under pressure applied substantially in the direction of their lengths, substantially as described.

2. The combination, with the axle and the shaft above and parallel thereto, of two sets of curved or angular arms, each consisting of two members united by a coil-spring, and the said so-formed angular arms connected by their ends to the shaft and axle, and arranged in relation to each other to form in substance a figure 8, and a coil surrounding said shaft loosely and connected by its ends to the upper members of each of said arms, substantially as set forth.

3. Spring-fork devices for bicycles and similar vehicles, consisting of the axle 4, the shaft 6, parallel with said axle, a support for said shaft, substantially as described, the fork-legs 8, hung on said shaft, the arms 9, secured on said axle, the springs 10, uniting said legs and arms, the posts 12, connected to the axle, the arms 15, secured on said shaft, the springs 18, uniting said posts and arms 15, and the springs 16, having an engagement with said legs and the arms 15, combined and operating substantially as set forth.

4. Spring-fork devices for bicycles and similar vehicles, consisting of the axle 4, the shaft 6, parallel with said axle, a support for said shaft, substantially as described, the fork-legs 8, hung on said shaft, the arms 9, secured on said axle, the springs 10, uniting said legs and arms, the posts 12, the arms 13 on said axle, the nuts 14, uniting arms 13 and said posts, the arms 15, secured on said shaft, the springs 18, uniting said posts and arms 15, and the springs 16, having an engagement with said legs and said arms 15, combined and operating substantially as set forth.

5. Spring-fork devices for bicycles and similar vehicles, consisting of the axle 4, the shaft 6, parallel with said axle, a support for said shaft, substantially as described, the legs 8, hung on said shaft and curving first toward one side of said axle and then in the opposite direction and terminating above and to one side of said axle, the arms 9, secured on said axle, the springs 10, uniting said legs and arms, the posts 12, connected to the axle, the arms 15, secured on said shaft, the springs 18, uniting said posts and arms 15, and the springs 16, having an engagement with said legs and the arms 15, combined and operating substantially as set forth.

6. Spring-fork devices for bicycles and similar vehicles, consisting of the axle 4, the shaft 6, parallel with said axle, a support for said shaft, substantially as described, the fork-legs 8, hung on said shaft, the arms 9, secured on said axle, the springs 10, uniting said legs and arms, the posts 12, connected to the axle and crossing said legs 8, the arms 15, secured on said shaft, the springs 18, uniting said posts and arms 15, and the springs 16, having an engagement with said legs and the arms 15, combined and operating substantially as set forth.

LEON BAUDREAU.

Witnesses:
G. M. CHAMBERLAIN,
H. A. CHAPIN.